United States Patent
Yim et al.

(10) Patent No.: US 8,036,674 B2
(45) Date of Patent: Oct. 11, 2011

(54) INTER-CELL INTERFERENCE PREDICTION FOR FREQUENCY RESOURCE ALLOCATION

(75) Inventors: Raymond Yim, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 355 days.

(21) Appl. No.: 12/408,667

(22) Filed: Mar. 20, 2009

(65) Prior Publication Data

US 2010/0240380 A1 Sep. 23, 2010

(51) Int. Cl.
*H04W 72/00* (2009.01)
*H04W 4/00* (2009.01)

(52) U.S. Cl. ........... 455/450; 455/452.1; 455/452.2; 455/464; 455/509; 370/329

(58) Field of Classification Search .............. 455/450, 455/452.1, 452.2, 453, 463, 464, 509, 522, 455/63.1, 63.3, 456.5, 524; 370/395.1, 395.41, 370/329

See application file for complete search history.

(56) References Cited

U.S. PATENT DOCUMENTS

| 7,453,861 B2 * | 11/2008 | Leung et al. ......... 455/63.1 |
| 2006/0094363 A1 * | 5/2006 | Kang et al. ......... 455/63.1 |

* cited by examiner

*Primary Examiner* — Lester Kincaid
*Assistant Examiner* — Thai Vu
(74) *Attorney, Agent, or Firm* — Dirk Brinkman; Gene Vinokur

(57) ABSTRACT

A method predicts resource allocations in a wireless network including a set of base stations (BSs). Each BS is in a cell, and serves a set of mobile stations. A sequence and rule of resource allocations are defined for all of the BSs. Previous resource allocations are acquired from the BSs in adjacent cells. In each BS, for a next allocation, inter-cell interference (ICI) is predicted independently for the set of MSs in the cell based on the previous resource allocations by the BSs in the adjacent cells and the sequence and rule of resource allocations. Then, each BS allocates the resources to the MSs in the cell based on the ICI and the previous resource allocations.

3 Claims, 4 Drawing Sheets

INTER-CELL INTERFERENCE PREDICTION FOR FREQUENCY RESOURCE ALLOCATION

FIELD OF THE INVENTION

This invention relates generally to wireless networks, and more particularly to predicting frequency resource allocation in wireless cellular network.

BACKGROUND OF THE INVENTION

Inter-Cell Interference

Inter-cell interference (ICI) can be the primary limiting factor on the performance of cellular networks. If mobile stations (MSs) located at edges of adjacent cells served by different base stations (BSs) use the same time and frequency resource to transmit data, then the MSs are subject to possible ICI. It is important that BSs have some methods for coordinating the allocation of frequency resources so that network performance is optimized.

Partial Frequency Reuse

Partial frequency reuse (PFR) can reduce ICI. Given all the available frequency resources in the network, PFR partitions the resources into disjoint set, and allocates the resources for use by MSs at in cell centers or in sectors at the edges of the cells.

With PFR, the MSs in adjacent cell edge sectors transmit using different frequency resources. Conventional PFR methods are fixed over time. The MSs in a particular sector of the cell must communicate with the BS using the frequency resources allocated for the sector.

While PFR is effective in reducing ICI, PFR decreases frequency diversity, because the MSs can only use a small part of the overall frequency spectrum. This implies that the MSs have less choice to send or receive data through frequency resource with good channel condition, thus restricting a maximum rate at which the BS and MSs can communicate.

Other forms of coordination requires centralized scheduling amongst the cells, which is very difficult to realize in practice given the vast amount of information that needs to be communicated with the centralized scheduler.

Therefore, there is a need to reduce ICI in a dynamic and flexible manner so that frequency diversity can be attained with minimal overhead.

SUMMARY OF THE INVENTION

The embodiments of the invention provide a method for acquiring previous frequency allocations by base stations (BSs). The invention uses a single, predefined shared sequence and rule of frequency allocations for the BSs. The invention predicts potential inter-cell interference (ICI) from BSs in adjacent cells based on the previous frequency allocations and the sequence and rule. Then, frequency resources can be allocated independently by each BS.

Each BS acquires information about the previous frequency allocations of the adjacent BS, and has access to the sequence and rule that control the potential allocations of frequency resources by the BS. Then, the BS can anticipate potential ICI caused by the BSs in adjacent cells. Using this knowledge of potential interference, each BS can allocate frequency resources independently. The resulting allocation can minimize ICI, while the BS has complete flexibility to select the frequency resource to transmit to the MSs in the cell.

The invention can increase network capacity by as much as 50% for a specific PFR scheme.

DETAILED DESCRIPTION OF THE PREFERRED EMBODIMENT

Network

Figure 1:
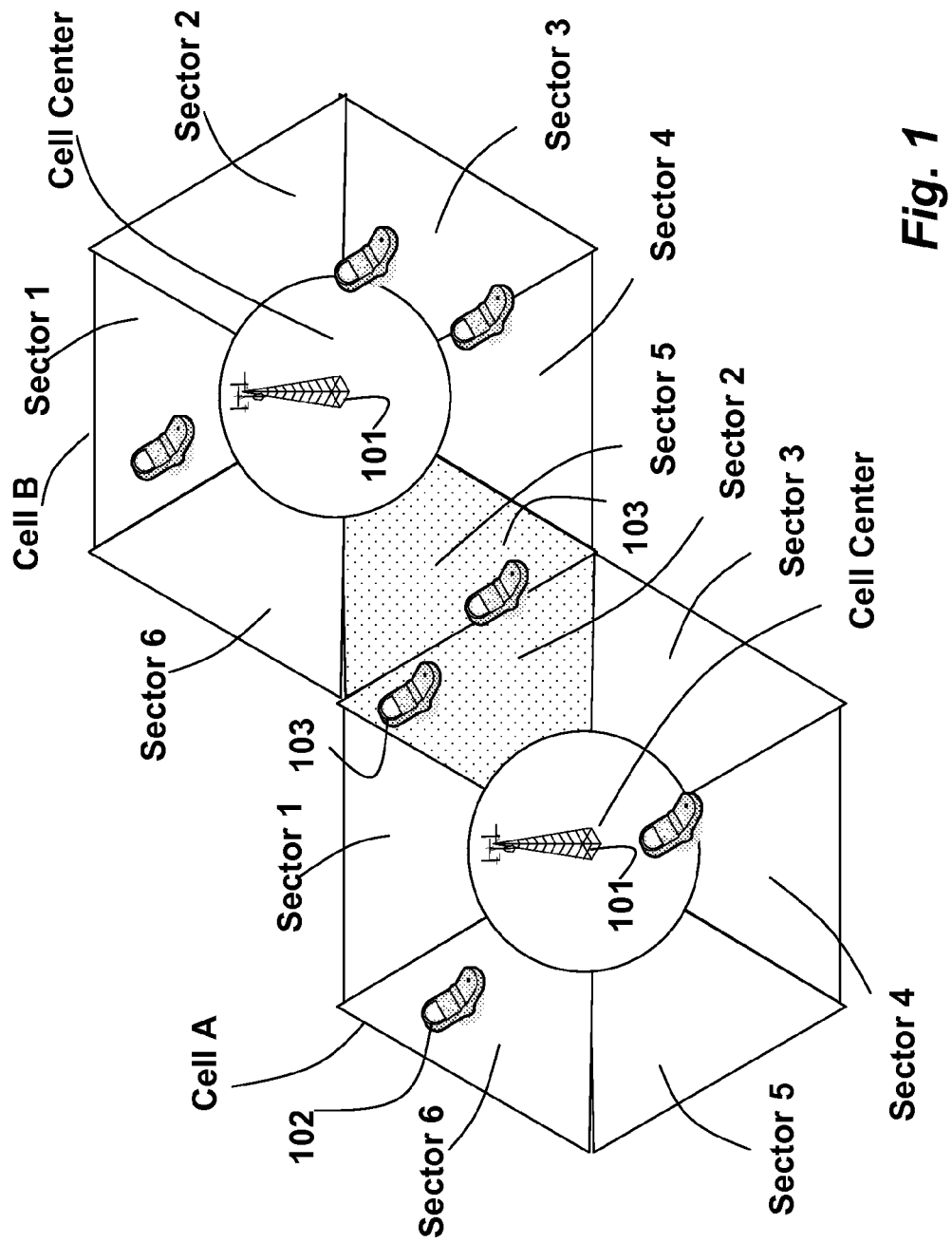
FIG. 1 is a schematic of two adjacent cells using embodiments of the invention.

As shown in FIG. 1, a network according to embodiments of the invention includes a set of base stations (BSs) located in cells. FIG. 1 shows cell A and cell B. Each BS serves a set of mobile stations (MSs) in each cell. Each cell is partitioned into a cell center and six sectors near the edges of the cell for the purpose of frequency and power allocation. The partitions can be effect by using multiple directional antennas at eh BSs. The stations communicate data packets using frames.

Due to power control, frequency resources used for the MSs in the cell center do not cause significant inter-cell interference (ICI) to MSs in adjacent cells. However, MSs 103 in sector 2 of cell A and sector 5 of cell B can experience ICI if the same frequency resource is allocated by the BSs.

Prediction Method

Figure 2:
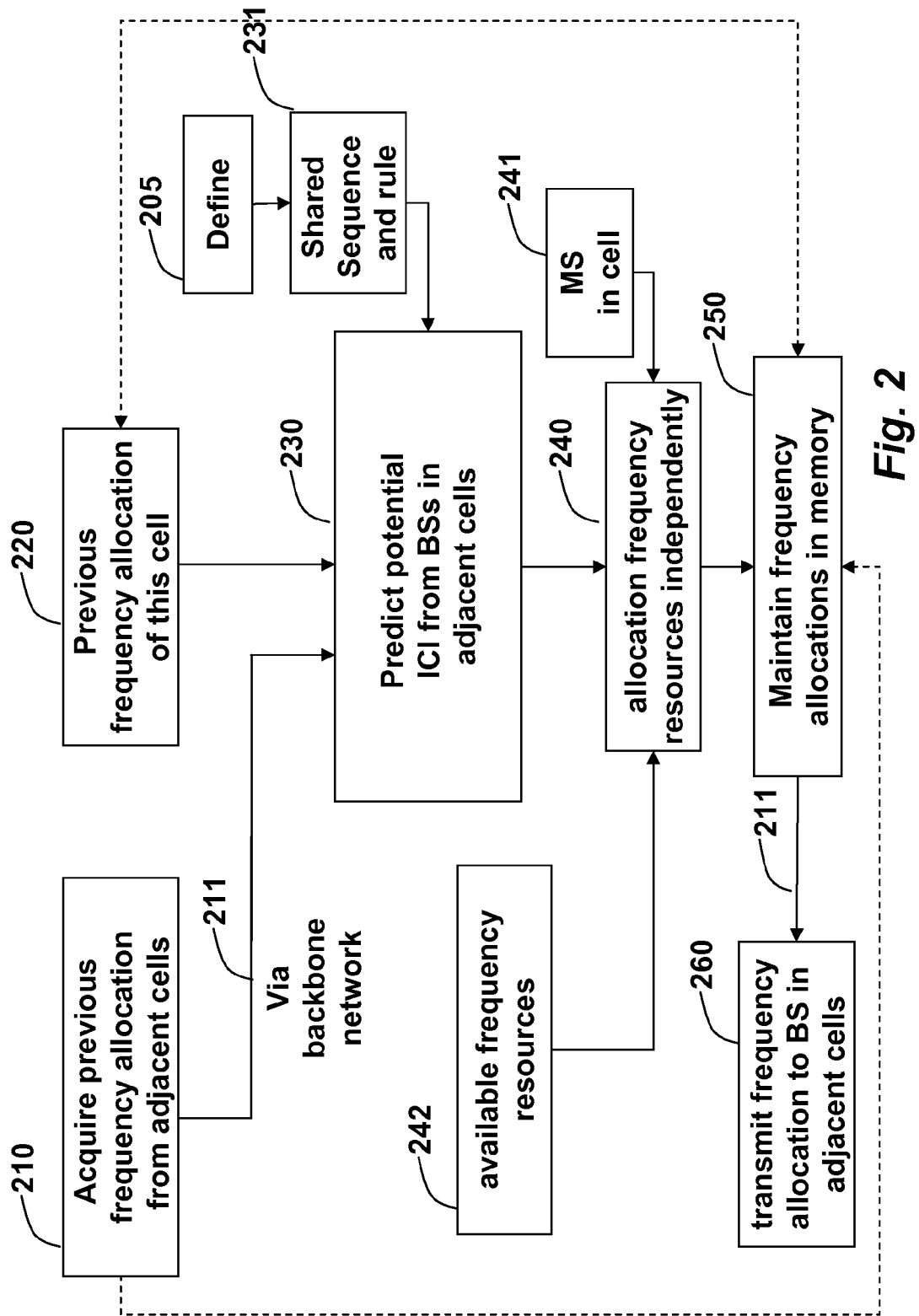
FIG. 2 is a flow chart of a method for predicting frequency resource allocation according to embodiments of the invention.

FIG. 2 shows the method for predicting frequency resources allocation according to embodiments of the invention.

Each BS has access to a single, shared and predefined sequence and rule of frequency resources allocations 231, which specify the potential frequency allocations over time. This sequence and rule can be defined 205 by the network operator based on a configuration of the network. Each resource in the sequence is for a next frame to be transmitted.

Each BS acquires 210 frequency resource allocations 210 from the BSs in adjacent cells via backbone communications 211, as well as its own previous allocations 220. The BS maintains 250 the previous frequency allocations in a memory.

For a next allocation, the BS predicts 230 the potential ICI to the MSs in the cell based on the previous frequency allocations used by the BSs in the adjacent cells. The sequence and rule constrains the frequency resources allocations to the MSs 241 in the cell.

Using the acquired allocations, ICI, channel conditions and possibly delay constraints, the BS allocates 240 independently frequency resources 242 according to the sequence and rule 231 and the previous frequency allocation of this cell 220.

The allocations can then be transmitted to the adjacent BSs for the acquisition, prediction and allocation cycle for the next frame to be transmitted.

Acquiring Previous Frequency Allocation

The previous frequency allocation information specifically refers to frequency allocation that causes ICI to the MSs in adjacent cells. For example, in the network shown in FIG. 1, only frequency allocation in sector 2 of cell A causes ICI to MSs in sectors 4, 5, and 6 in cell B. Hence, the BS in cell A transmits its frequency allocation in sector 2 to the BS cell B, and the BS in cell B transmits its frequency allocation in sector 5 to the BS in cell A.

Shared Sequence and Rule of Allocations

The shared sequence and rule constrain the allocations by the BS based on previous allocations. Thus, the BS can predict possible ICI from the BSs in the adjacent cells. We describe some example sequences and rules, where each BS 101 has N frequency resources that can be used to communicate with MSs 141 in the cell.

A pre-defined sequence S have N elements $\{S_0, S_1, \ldots, S_{N-1}\}$, with $S_j = j+1$ for $j=0, 1, 2, \ldots, N-1$. The rule specifies that if the cell allocates a frequency resource $S_k$ for the MSs in a sector in the cell for frame $t_0$, then the cell can allocate frequency resource $S_k$ and $S_{(k+1) mod N}$ in the sector for frame $t_0+1$.

If all the frequency resource are used at every frame, then the frequency allocation sequence as $\{0\}, \{0, 1\}, \{0, 1, 2\}, \{0, 1, 2, 3\}, \{0, 1, 2, 3, 4\}$, and so on.

Using the same sequence, another rule may be set so that if $S_k$ has an odd number of elements, then resource k is allocated for the MSs at frame $t_0$. The BS can allocate resource $S_k$ and $S_{(k+1) mod N}$ in the next frame. If $S_k$ is even, and the resource is allocated to the MSs in the sector in the cell at frame $t_0$, then the cell can allocate resources $S_{(k-3) mod N}$ and $S_{(k+1) mod N}$ during the next frame.

If all frequency resources are used during every frame, then the frequency allocation the sequence is $\{5\}, \{5, 6\}, \{3, 5, 6, 7\}, \{3, 4, 5, 6, 7, 8\}, \{1, 3, 4, 5, 6, 7, 8, 9\}, \{1, 2, 3, 4, 5, 6, 7, 8, 9, 10\}$ and so on.

It is also possible to replace the sequence of the examples above, $\{S_0, S_1, S_{N-1}\}$, by any sequence such that $S_i \neq S_j$ for all $i \neq j$.

Another rule may be that if the BS allocates a frequency resource $S_k$ for frame $t_0$, then the BS can allocate frequency resource $S_k$, $S_{(k+1) mod N}$ and $S_{(k+2) mod N}$ for frame $t_0+1$.

Another rule may be that if the BS allocates a frequency resource $S_k$ for frame $t_0$, then the BS can allocate frequency resource $S_k$, $S_{(k+1) mod N}$ and $S_{(k+3) mod N}$ for frame $t_0+1$.

The rule for frequency resource allocation at frame $t_0+1$ depends on the frequency resource allocation for frames $t_0$ and $t_0-1$, and possible more previous allocation information is used.

For an extreme case, the rule can be set such that if the BS allocates a frequency resource $S_k$ for frame to, then the BS can allocate any frequency for frame $t_0+1$.

Because frequency resources used for the MSs in cell center do not cause significant ICI to the MSs in the adjacent cell, the allocation for cell center can have a different rule than the other sectors in the cell. For example, the BS can allocate frequency resources to the MSs in the cell center regardless of any previous allocations.

Deriving Potential Frequency Resources and Interference

The previous frequency allocations and the shared pre-defined sequence and rule enable the scheduler to predict ICI from the BSs in adjacent cells based on their previous allocation. The previous frequency allocations also define a potential set of frequency resources that can be used to communicate with the MSs in a particular sector in the cell.

The BS scheduler is not required to allocate a specific frequency resource in the sequence. Therefore, the BS station determines not to use any frequency resource to communicate with the MSs in a particular sector. In this case, given the rule for the sequence, the BS cannot use any frequency resource for MSs in that particular cell in the subsequent frames. Three possible methods can be used to resolve this issue.

Method 1: When a sector has no frequency allocation in frame $t_0$, the scheduler can select one or more frequency resources at random for use during frame $t_0+1$.

Method 2: When a sector has no frequency allocation in frame to, the scheduler can select a predefined frequency resource for the sector.

Method 3: When a sector has no frequency allocation in frame $t_0, t_0-1, \ldots, t_0-m$, for some arbitrary $m \geq 0$, and the sector has used some frequency resources for a sector during frame $t_0-m-1$, the BS scheduler can select those specific frequency resources for the sector for frame $t_0+1$.

It may also be necessary to predict the ICI that results if the BS in the adjacent cell actually transmits on one of the potential frequency resources given its previous allocation. The actual ICI is network dependent. For example, some network uses higher transmission power if the MS requires a higher transmission rate, thus increasing ICI. The interfering power can be affected due to beamforming or preceding. Also, the ICI at each MS differs depending on the exact location of the MS.

We describe the worst case interference power, and then the ICI can be predicted using some fraction of the worst case value. We describe the use of the fraction below.

Figure 3:
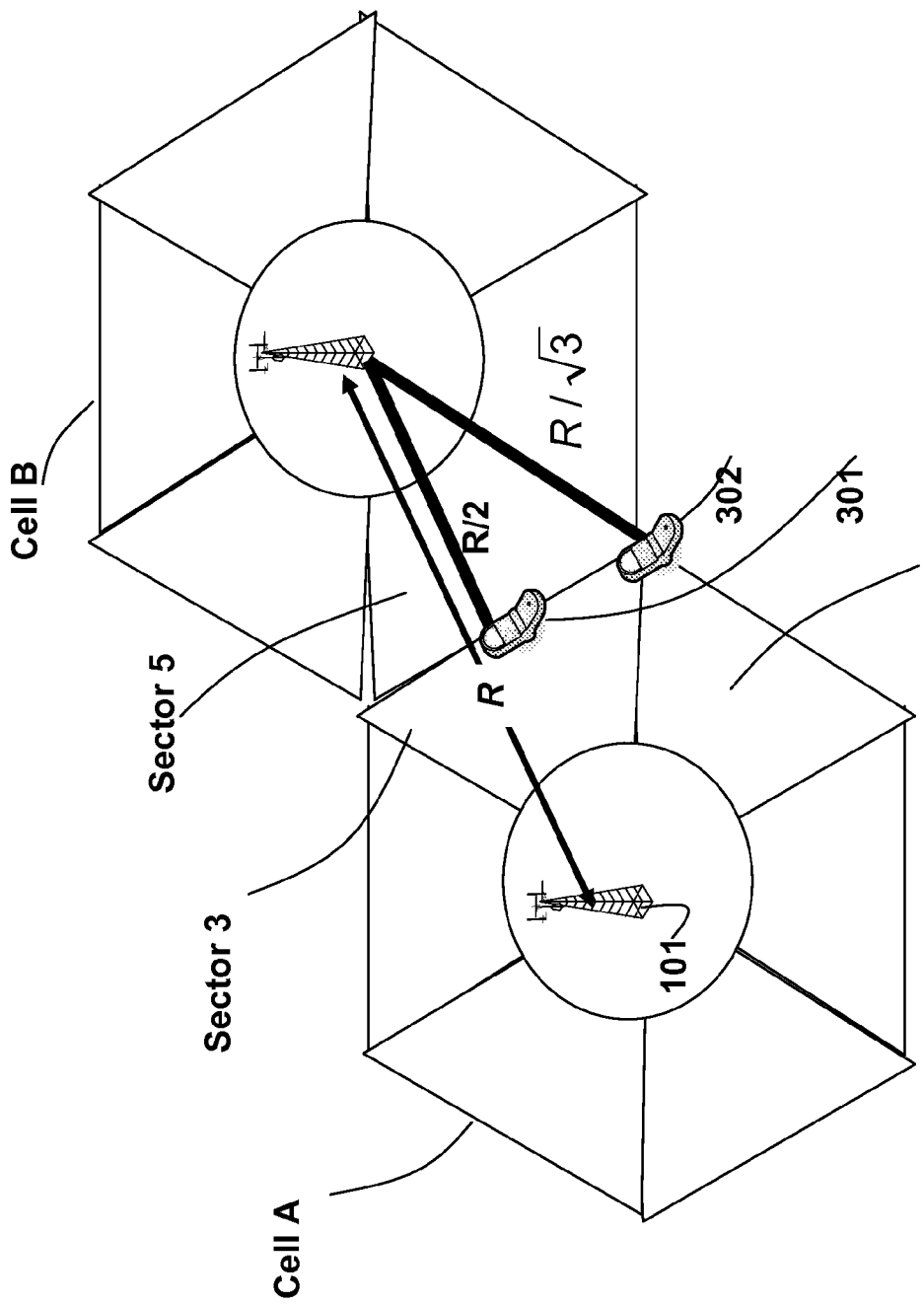
FIG. 3 is a schematic of worst-case strong and weak interference.

If a distance between two adjacent BSs is R, and the transmission power to the MSs in the sectors is PC, the worst case interferences 301-302 that a transmission to Sector 5 of Cell B in FIG. 3 causes in sectors 2 and 3 of Cell A, respectively denoted as $I_{Strong}$ and $I_{Weak}$, are $$I_{Strong} = PC\left(\frac{2}{R}\right)^\alpha, \text{ and}$$

$$I_{Weak} = PC\left(\frac{\sqrt{3}}{R}\right)^\alpha,$$

where $I_{strong} > I_{weak}$, where C is a constant, and $\alpha$ is a channel path exponent. These expressions assume the BSs stations are regularly located, and omit effects such as fading and shadowing effect. In practice, an operator deploying the BSs can perform ICI measurement, and used the measured result for the scheduling method.

Performing Frequency Allocation

Figure 4:
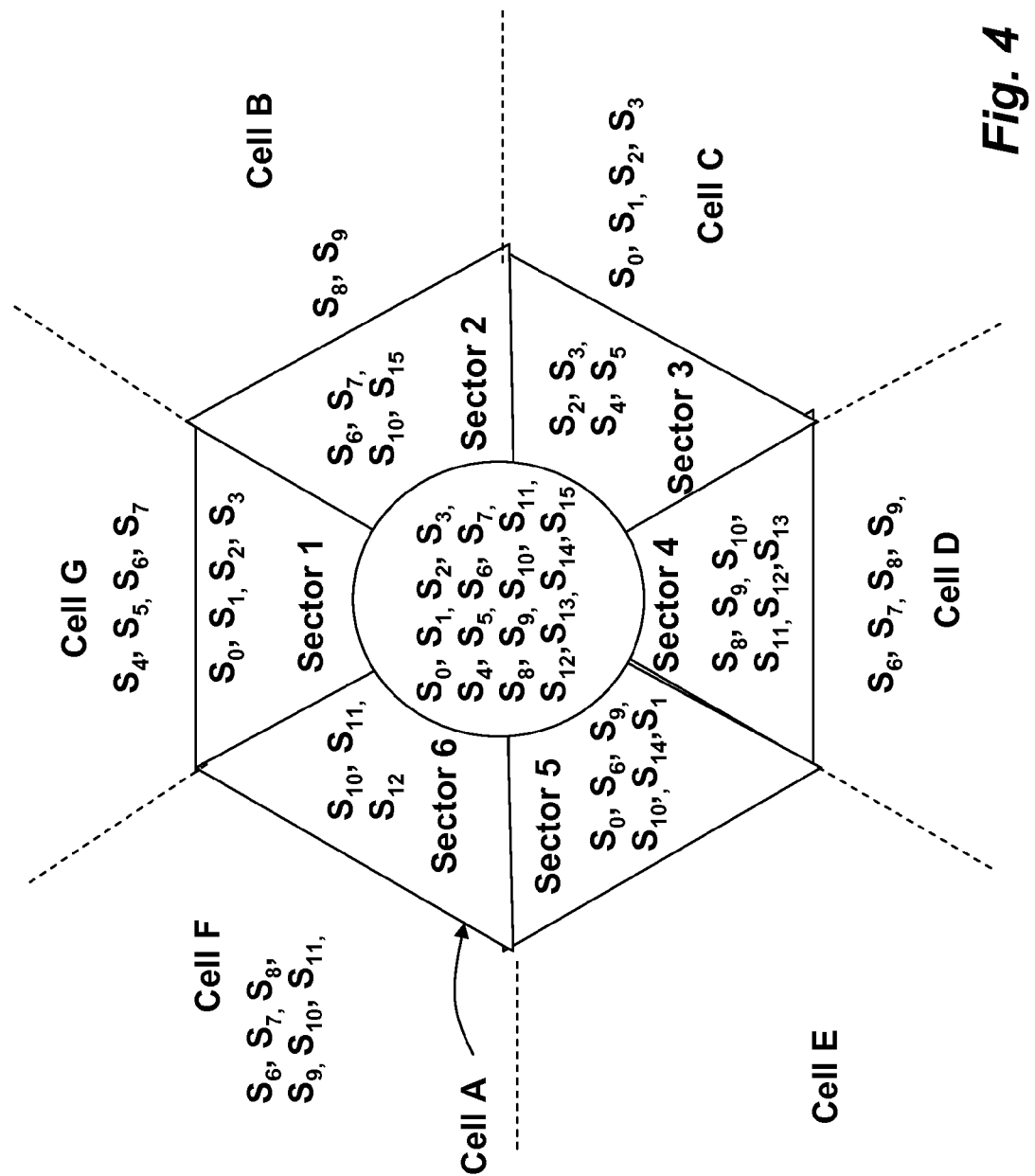
FIG. 4 is a schematic of example frequency resources at a particular time according to embodiments of the invention.

FIG. 4 shows an example of potential frequency allocations in various sectors. There are sixteen frequency resources, $S_0, S_1, \ldots, S_{15}$, and the resources listed at each sector are the potential frequency resources given by a shared predefined sequence and the respective previous allocations.

Specifically for this example, the BS can use resources $S_0, S_1, S_2, S_3$ to communicate with the MSs in sector 1 of cell A, and the BS can use resources $S_2, S_3, S_4, S_5$ to communicate with the MS in sector 3. The BS can use any resource to communicate with the MS in the center cell. However, resources $S_2$ and $S_3$ can only be allocated to a single MS in sector 1, sector 3, or the cell center.

The BS station determines the allocations for each MS to achieve an optimal network capacity. The BS station also determines a highest possible transmission rate for communicating with the MS, such that the probability of packet loss due to ICI is minimized.

The transmission rate, in bits per frame, that the BS can use to send data to the MS u, when no ICI is experienced is given by the Shannon capacity formula:

$$R_{no-interference}^{u,i} = \frac{Wt}{2}\log_2\left(1 + \frac{|h_{u,i}|^2 P}{\sigma^2}\right),$$

where W is the bandwidth, t is a time duration of a frame, $h_{u,i}$ is the channel gain from the BS to the MS for frequency resource $S_i$, P is the transmit power at the BS, and $\sigma^2$ is the noise power.

If a strong interference results from the transmission of an adjacent cell, then the rate is $$R_{strong-interference}^{u,i} = \frac{Wt}{2}\log_2\left(1 + \frac{|h_{u,i}|^2 P}{\beta I_{Strong} + \sigma^2}\right),$$

where β is a network parameter that reduces the worst case interference because most MSs do not experience maximum interference. If a weak interference is experienced, then the rate is $$R_{weak-interference}^{u,i} = \frac{Wt}{2}\log_2\left(1 + \frac{|h_{u,i}|^2 P}{\beta I_{Weak} + \sigma^2}\right).$$

The BS determines the transmission rate based on the location of the MS, the channel gain of each of the frequency resources to the MS, and the potential interference. We reduce the rate whenever there is potential interference.

The method proceeds as follows:

First, for each MS u, the potential transmission rate of using frequency resource $S_i$ is $R_{no-interference}^{u,i}$ if MS u is in the center cell, or if $S_i$ is not a potential frequency resource for adjacent cell next to the sector at which MS u is located, nor is it used in the adjacent cells next to the sectors adjacent to the sector which MS u is located.

For example, in FIG. 4, if the MS u is located in sector 1, and $S_0$ is not used by cells G, B, and F, then the BS uses $R_{no-interference}^{u,0}$.

The potential transmission rate of using frequency resource $S_i$ is $R_{strong-interference}^{u,i}$ when $S_i$ is a potential frequency resource for the adjacent cell next to the sector in which MS u is located. For example, if MS u is located in sector 3 and $S_2$ is potentially used by cell C, then the BS station uses $R_{strong-interference}^{u,2}$.

If $S_i$ is a potential frequency resource used in the adjacent cells next to the sectors adjacent to the sector in which the MS u is located, then the potential transmission rate of using frequency resource $S_i$ is $R_{weak-interference}^{u,i}$. For example, if the MS u is located in sector 5 and $S_{10}$ is potentially used by the cell F, the BS uses $R_{weak-interference}^{u,10}$. The potential transmission rate of using frequency resource $S_i$ is zero, if $S_i$ is not a potential frequency resource in the sector at which the MS u is present. The resulting potential transmission rate is $R_{u,i}$.

The scheduling can include the following methods.

The first method assumes that no queuing information or other priority metric is given to the BS scheduler. In this case, the BS greedily allocates the resource, in descending order, from the MS that can achieve the highest potential rate to the MSs with the lower potential rates, until all frequency resources are allocated. Each frequency resource can only be allocated one time. The method can be described by the following pseudo code:

```
Initialize S = {0, 1, 2, ..., 14, 15} (all frequency resources)
While S ≠ ∅ k = argmax (max R_{u,i})
         i∈S     u

Allocate S_k to MS u, transmit data to MS u at rate ⌊R_{u,k}⌋
Set S = S\ {k}
End while
```

The second method assumes the BS scheduler has information such as queuing information or other priority metric. For example, if each MS u has $q_u$ packets in a queue, the scheduler obtains a new metric $M_{u,i}$ by multiplying the potential rate by $q_u$, and then greedily allocates the resource, in descending order, from the MS that can achieve the highest potential rate to the MSs with lower $M_{u,i}$, until all frequency resources are allocated. The method can be described by the following pseudo code:

```
Initialize S = {0, 1, 2, ..., 14, 15} (all frequency resources)
While S ≠ ∅
For each MS u and i, compute M_{u,i} = R_{u,i} q_u k = argmax (max M_{u,i})
         i∈S     u Allocate S_k to MS u, transmit data to MS u at rate ⌊R_{u,k}⌋
Set S = S\ {k}
Set q_u = max{q_u - ⌊R_{u,i}⌋, 0}
End while
```

The statement "Set $q_u=\max\{q_u-\lfloor R_{u,i}\rfloor, 0\}$" only applies to the case where $q_u$ denotes the queue length. If $q_u$ denotes other priority metric, the statement can be omitted.

Alternative Embodiments

Instead of performing the prediction of frequency resource allocation every frame, it is possible that the frequency resource allocation remains fixed for multiple frames, before switching to a new set of frequency resources. This reduces the communication requirement over the backbone. The previous frequency allocation information can be some or all of the frequency resources that are used while the frequency resource allocation remains fixed.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for predicting resource allocations in wireless network including a set of base stations (BSs), wherein each BS is in a cell, and wherein each BS serves a set of mobile stations in the cell, and wherein each cell is partitioned into a cell center and a set of sectors near edges of the cell, and the resource includes frequencies comprising:

defining a sequence and rule of resource allocations for all of the BSs, wherein the sequence is shared by the set of BSs;

acquiring, by each BS, previous resource allocations from the BSs in adjacent cells;

predicting independently in each BS, for a next allocation, inter-cell interference (ICI) to the set of MSs in the cell based on the previous resource allocations by the BSs in the adjacent cells and the sequence and rule of resource allocations; and allocating independently by each BS, the resources to the MSs in the cell based on the ICI and the previous resource allocations using the sequence of resource allocations, and wherein a distance between two adjacent BSs is R and the transmission power to the MSs in the sectors is PC, and wherein strong interference $I_{Strong}$ and weak interference $I_{Weak}$ are respectively $$I_{Strong} = PC\left(\frac{2}{R}\right)^\alpha, \text{ and}$$

$$I_{Weak} = PC\left(\frac{\sqrt{3}}{R}\right)^\alpha,$$

where $I_{Strong} \geq I_{Weak}$, where C is a constant, and $\alpha$ is a channel path exponent.

2. The method of claim 1, further comprising:
maintaining in a memory, for each BS, the previous resource allocations of the BSs in the adjacent cells and previous resource allocation by the BS.

3. The method of claim 1, further comprising:
transmitting, frequency allocation of a base station to an adjacent cell.

* * * * *